L. M. LEE.
Post-Hole and Well-Auger.
No. 198,517. Patented Dec. 25, 1877.
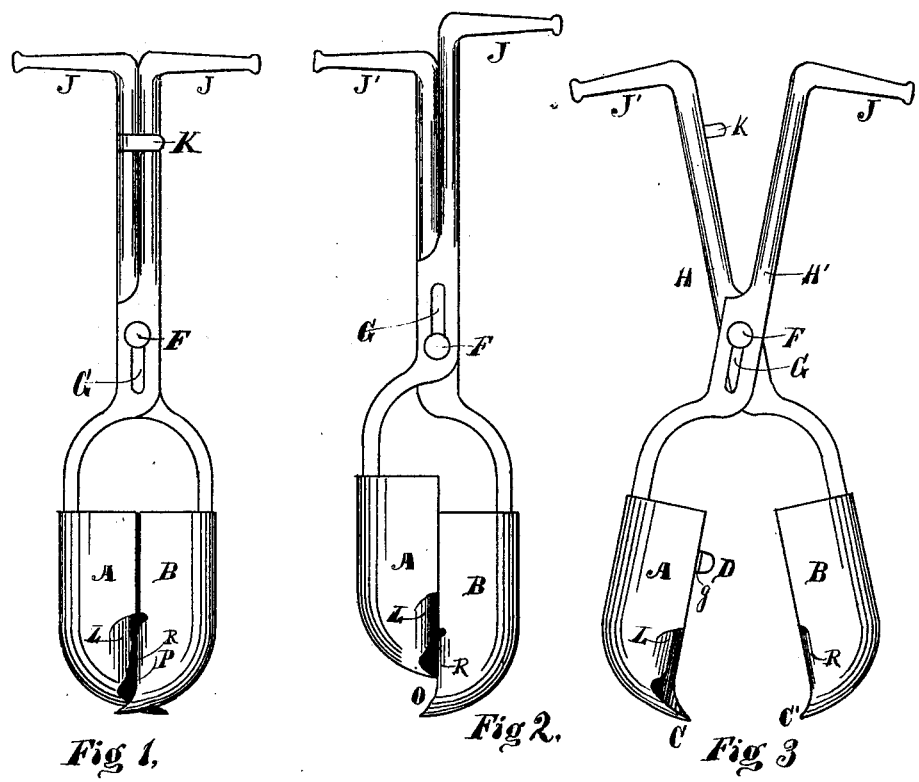
WITNESSES; INVENTOR.

UNITED STATES PATENT OFFICE.

LOUIS M. LEE, OF FAIRLAND, INDIANA.

IMPROVEMENT IN POST-HOLE AND WELL AUGERS.

Specification forming part of Letters Patent No. 198,517, dated December 25, 1877; application filed August 14, 1877.

*To all whom it may concern:*

Be it known that I, LOUIS M. LEE, of Fairland, Shelby county, State of Indiana, have invented a new and useful Improvement in Post-Hole and Well Augers, of which the following is a description, reference being had to the accompanying drawings.

Previous to my invention post-hole augers have been made of various forms; but I am not aware that any of them are constructed and arranged to operate in the same manner as my improved auger.

The object of my invention is to construct an auger in such a manner as to allow the auger to be twisted into the ground, and to allow one side to be worked up and down, so as to work stones and other obstructions inside of the auger-cases, and to allow the auger-cases to be opened when drawn from the hole, so as to free the dirt from the cases and deposit it on the ground.

My invention consists of the construction and arrangement of parts whereby certain results are obtained, as will be fully set forth and described in the specification and claims hereunto annexed.

Figure 1 represents a side elevation of my improved auger, showing the two halves of the auger even. Fig. 2 represents the same with one-half of the auger elevated, as in working in a stone. Fig. 3 represents the auger open, so as to deposit the earth that is brought up in the auger. Fig. 4 is a view of one side of the auger.

A and B represent the two semicircular sides of the auger, to which the bits or auger-points C C' are attached to or forged thereon; or the side cases A and B may be cast or swaged, and the auger-points formed at the same time and out of the same piece. D represents snap-catches, which are secured to one half of the cases A or B, as shown, in such manner as to engage with a catch strip or rib on the opposite case, and hold the two cases close together, and at the same time allow the sides to work up and down without becoming disengaged. The notch *g* engages with the rib on the inside of the opposite side. (Not shown.)

On one side of each half of the semicircular auger-cases A and B the side is cut away and bent inward, as shown at L in all the figures, and the opposite sides are turned outward and provided with cutting-edges, so as to freely engage with the earth, as shown at R and P.

The two handles H H' are united to the auger sides A and B, as shown, and are pivoted together at F, the pivot F operating in a slot, G, formed in one or both handles, as shown.

By this arrangement the auger can have one side worked up and down while in the ground, so as to work any stone or other obstruction that may be encountered inside of the semicircular cases A and B, as shown in Fig. 2, in which the stone is represented by the letter O.

The auger is revolved and operated up and down by means of the handles J J', and the handles H H' are held together by a spring or snap-catch, K, so as to prevent the handles from twisting.

In boring a hole with my improved auger, the auger is twisted into the ground when in the position shown in Fig. 1, and if a stone or other like obstruction should be encountered, then the side A is worked up and down by the handle J, and the auger partially rotated until the stone is worked inside of the semicircular cases. When the auger-cases are full of dirt, then the auger is removed and opened, as in Fig. 3, when the dirt is freed and deposited on the ground.

What I claim as new, and wish to secure by Letters Patent, is—

1. A post-hole or well auger constructed with two semicircular sides, A and B, which are provided with auger-points C C' below, and handles H H' above, pivoted at F in slot G, in the manner and for the purposes hereinbefore set forth.

2. In a post-hole or well auger, the combination of the pivoted sliding handles H H', catch K, and semicircular side auger-cases A and B, constructed and arranged to operate in the manner and for the purposes substantially as set forth and described.

In testimony whereof I have signed my name to this specification in the presence of two subscribing witnesses.

LOUIS M. LEE.

Witnesses:
 E. O. FRINK,
 G. F. FRY.